United States Patent [19]

Johansson et al.

[11] Patent Number: 5,173,932
[45] Date of Patent: Dec. 22, 1992

[54] SECURITY SYSTEM COMPRISING A SIGNAL TRANSMITTER

[76] Inventors: Jan Lennart Johansson, Champinjonvagen 6, S-510 95, Dalstorp; Lars A. Wern, Sveavagen 104, S-11350, Stockholm, both of Sweden

[21] Appl. No.: 399,461
[22] PCT Filed: Mar. 30, 1988
[86] PCT No.: PCT/SE88/00163
§ 371 Date: Jul. 11, 1990
§ 102(e) Date: Jul. 11, 1990
[87] PCT Pub. No.: WO88/08183
PCT Pub. Date: Oct. 20, 1988

[30] Foreign Application Priority Data
Apr. 8, 1987 [SE] Sweden .................. 8701472-6

[51] Int. Cl.⁵ .................................... H04M 11/04
[52] U.S. Cl. ........................... 379/40; 379/44; 379/47; 340/531; 340/522
[58] Field of Search ............... 379/110, 39–41, 379/44, 45, 47, 51; 340/531, 522

[56] References Cited
U.S. PATENT DOCUMENTS 3,883,695 5/1975 Bickel et al. ...................... 379/40
4,056,684 11/1977 Lindstrom ........................ 379/40
4,145,581 3/1979 Stockdale ......................... 379/40
4,195,286 3/1980 Galvin ............................. 340/522
4,471,346 9/1984 Nelson et al. .................... 379/110
4,565,902 11/1986 Phillipps .......................... 379/51

Primary Examiner—James L. Dwyer
Assistant Examiner—Wing F. Chan
Attorney, Agent, or Firm—Pollock, VandeSande & Priddy

[57] ABSTRACT

A security system comprises a signal transmitter (1) with a first sensor (2) for conveying status information to a receiver (3) via a telecommunication channel (4), the signal transmitter being preferably built into a telephone set and the telecommunication channel preferably comprising a subscriber line in a regular telephone network. A second sensor having a higher sensitivity than the first sensor, is arranged to be influenced by the same alarm situation as the first sensor to transmit alarm information to the receiver via the telecommunication channel, and a restoring circuit (6) comprising time measuring components (7, 8) with an activation input (9) connected to the second sensor is, within a time slot of a predetermined length arranged for the transmittal of the status information and the alarm information, arranged to always transmit restoring information regarding the alarm information to the receiver.

18 Claims, 4 Drawing Sheets

SECURITY SYSTEM COMPRISING A SIGNAL TRANSMITTER

TECHNICAL FIELD

This invention relates to a security system comprisig a signal transmitter with a sensor means for conveying a status information to a receiver means via a telecommunication channel.

STATE OF THE PRIOR ART

U.S. Pat. No. 4,558,181 describes a security system of the above-mentioned kind. This known system comprises a portable transmitter arranged to be capable of conveying synthetic speech for different alarm messages, e.g. intrusion, inundation, low temperature and power failure, as well as acoustic signals generated by stand-alone fire detectors, etc.

A problem with this known security system and with all others of the kind is that the market is limited since installations that combine good false alarm protection with a sure and early alarm function are difficult to make inexpensive.

DESCPTION OF THE INVENTION

The invention relates to a security system that can, at a low cost of installation, combine good false alarm protection with a sure and early alarm function.

In a preferred embodiment of the invention, a subscriber line in a regular telephone network is used as the only wiring, and the only equipment is a calling and called telephone set.

According to the invention, an alarm can be conveyed between the calling and called telephone sets locally along the subscriber line as well as externally to a predetermined subscriber or to a stored program controlled exchange arranged to process the alarm, for example to call a plurality of telephone numbers, the same conditions enabling a sure and early alarm function being used, according to the invention, for preventing false alarms as defined in the subsequent patent claims.

Besides using the common push-buttons on the calling telephone set, commonly used tone code dialers can be utilized for entering alarm messages as well as for preventing alarm upon entrance into a protected area.

For recording and reproduction of freely selected spoken or tone coded messages, according to the invention, commonly known telephone answering equipments can be utilized without any changes in their manuals.

However, if the alarm receiver is a modern paging unit, recorded spoken messages as well as synthetic speech substitutes are the wrong technology. In any case, a low cost semiconductor memory for the storage of the alarm messages in the calling telephone set constitutes a preferred basic component for realizing the invention.

For an intrusion alarm, the preferred embodiment of the invention uses a capacitive sensor means built into the calling telephone set and designed in such a way that a presence indication within an accurately defined radius is obtained.

DESCRIPTION OF THE ACCOMPANYING DRAWINGS

The invention will be described with reference to the accompanying drawing in which FIGS. 1, 2 and 3 are block diagrams of the preferred embodiments of a security system according to the invention, and FIG. 4 is a perspective view of a preferred design of a telephone set that constitutes a complete security system according to the invention.

DESCRIPTION OF THE PREFERRED EMBODIMENT

Figure 1:
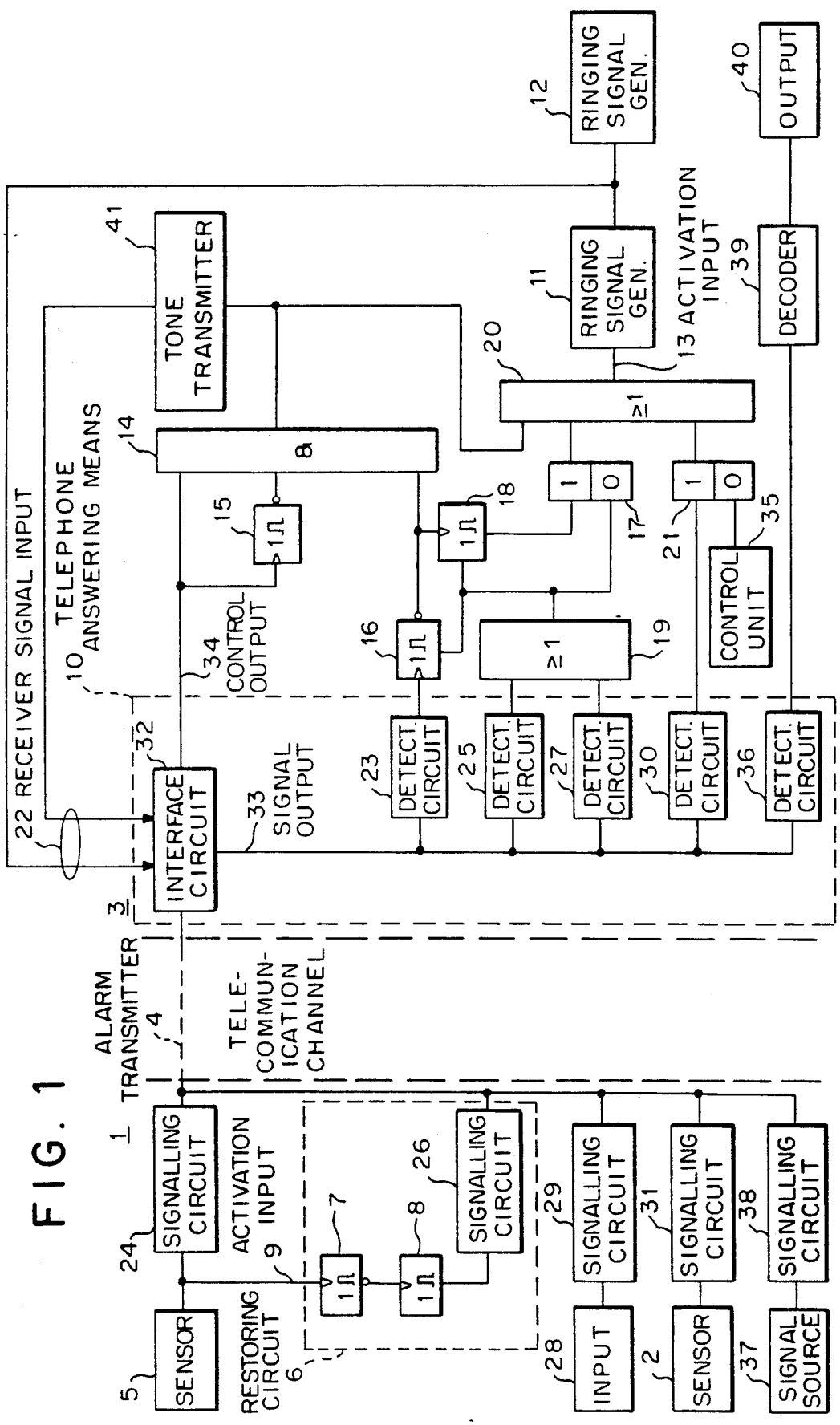

FIG. 1 shows a block diagram of the preferred embodiment of the security systems of the invention, comprising an alarm transmitter 1 with a sensor means 2 arranged to transmit a status information to a receiver 3 via a telecommunication channel 4. According to the invention, there is a sensor means 5 arranged, with a higher sensitivity than the sensor means 2, to be influenced by one and the same environment as this and to convey an alarm information to the receiver 3 via the telecommunication channel 4, a restoring circuit 6 comprising time measuring means 7 and 8 with an activation input 9 connected to the sensor means 5 being, without any external influence and within a time slot of a predetermined length arranged for the transmittal of the status information and the alarm information, arranged to transmit a restoring information regarding the alarm information to the receiver 3.

The alarm transmitter 1 with the sensor means 2 and 5 for the status information and the alarm information, respectively, are, according to the example, built into a portable telephone subscriber equipment, the telecommunication channel 4 comprising a subscriber line in a regular telephone network.

According to the example, the receiver 3 comprises also a telephone answering means 10 arranged to be connected to said subscriber line in order to receive the status information, the alarm information and the restoring information, and ringing signal generating means 11 and 12 with an activation input 13 connected to logical means 14, 15, 16, 17, 18, 19, 20 and 21 connected to said telephone answering means 10 and arranged to delay an activation of the ringing signal generating means 11 and 12 within said time slot of predetermined length dependent on a reception of the alarm information, to activate with priority over said delay the ringing signal generating means 11 and 12 dependent on a reception of the status information, and to prevent the delayed activation of the ringing signal generating means 11 and 12 dependent on a reception of said restoring information.

Said telephone answering means 10 has a signal input 22 connected to an outlet from said ringing signal generating means 11 and 12 (according to the example consisting of a pulse generator and a tone ringer, respectively) and comprises a detector circuit 23 for said alarm information transmitted from the sensor means 5 via a signalling circuit 24, a second detector circuit 25 for said restoring information transmitted from a signalling circuit 26 in the restoring circuit 6, a third detector circuit 27 for a manual restoring information sent from an input means 28 via a signalling circuit 29, a fourth detector circuit 30 for said status information transmitted from the sensor means 2 via a signalling circuit 31, and a ringing signal detector interface circuit 32 for said signal input 22, for a signal output 33 to said detector circuits and for a control output 34 arranged to provide a control signal to said logical means in dependence on the telephone answering means 10 being activated by a ringing signal in known manner.

According to the example, the signalling circuits 24, 26, 29 and 31 convey via tone code in known manner their information to the detector circuits 23, 25, 27 and 30.

Said logical means comprise the AND-gate 14 arranged to receive control signals from said telephone answering means 10 partly via a direct connection, partly via the inverting monostable flip-flop 15, and partly via the monostable flip-flop 16 controlled by the detector circuit 23. The flip-flop 15 inhibits the AND-gate 14 during for example 10 seconds and then the flip-flop 16 after a reception of the alarm information further inhibits and AND-gate 14 during for example another 30 seconds and is arranged to thereafter activate a bistable flip-flop 17 via a monostable flip-flop 18. This activation will, however, become prevented by an inhibiting signal from the OR-gate 19 arranged to receive the restoring signals from the detector circuits 25 and 27 to reset the flip-flops 16, 17 and 18.

Via the OR-gate 20 can the ringing signal generating means 11 and 12 be activated partly by the AND-gate 14, partly by the bistable flip-flop 17 if the restoring information is not received, and partly by the bistable flip-flop 21 arranged to be activated by the detector circuit 30 and to be reset by a control unit 35.

Said telephone answering means 10 comprises a fifth detector circuit 36 in order to receive, within the previously mentioned time slot, further information from a signal source 37 via a signalling circuit 38 and feed this to a decoder means 39 with an output means 40. This further information can relate to personal messages or references as well as to surveillance video via the regular telephone network as described in the U.S. Pat. Nos. 3,995,106 and 3,903,362.

However, the output means 40, the decoder 39 and the detector circuit 36 provide, according to the example, primarily the function of a data logger with respect to all that is sent from the alarm transmitter 1.

The principal concept of the invention is simply built on the insight of the need of a time slot of a predetermined length, according to the example ½ minute, in order to provide a good false alarm protection in combination with a sure and early alarm function. When something in the environment has caused an alarm so that the time slot has been opened, then this can be utilized in order to create a decision basis via collecting different types of status information implying anything from simple listening to visual inspection via surveillance video.

For controlling the receiver 3 via the telephone network, for example from the alarm transmitter 1, the receiver 3 comprises a tone transmitter 41 arranged to be activated by the AND-gate 14 in order to supply a predetermined signal to the signal input of the telephone answering means 10.

Figure 2:
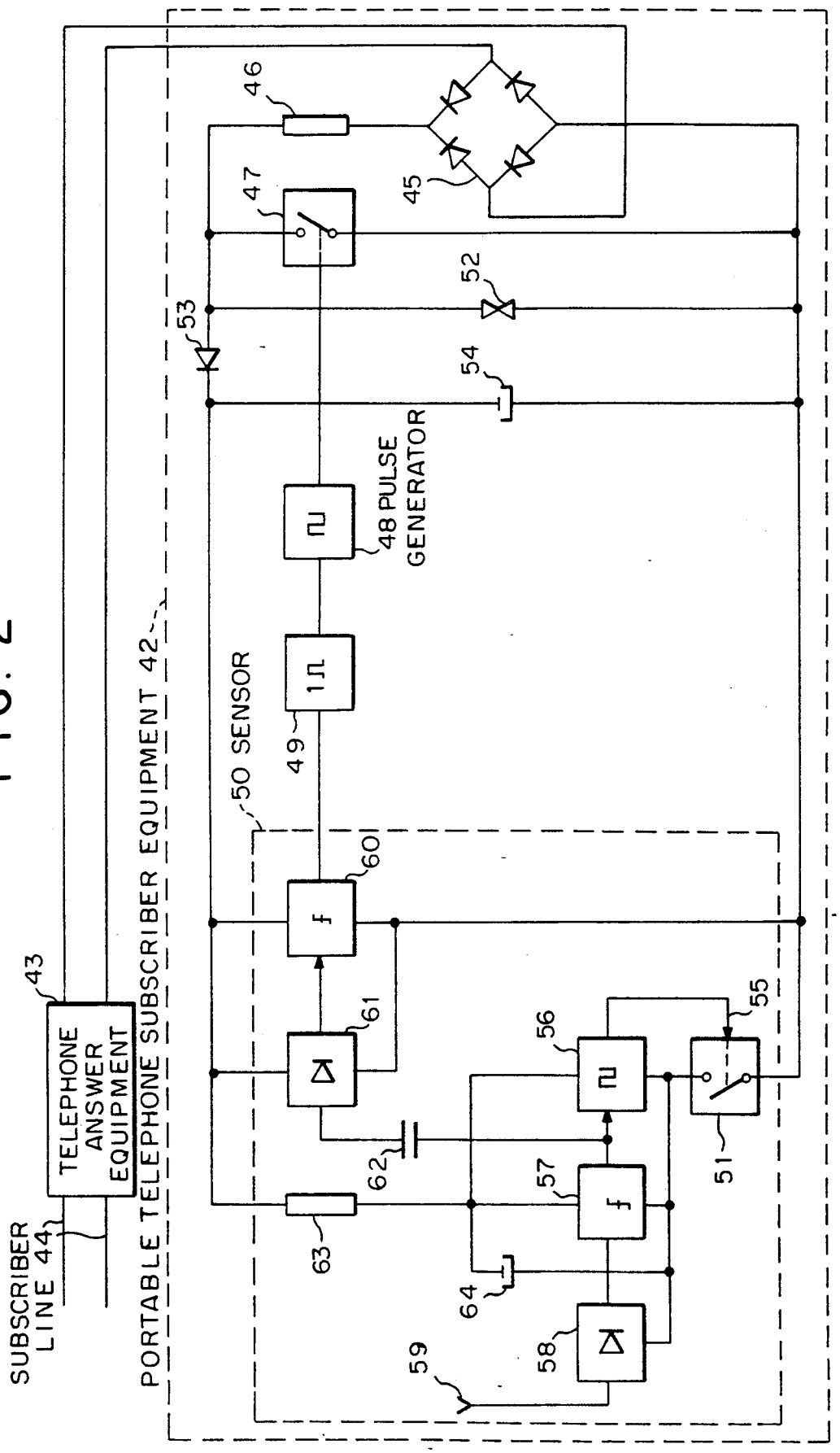

FIG. 2 is a block diagram of a portable telephone subscriber equipment 42 connected to a telephone answering equipment 43 via a subscriber line 44. The telephone subscriber equipment 42 is provided with a ringing signal simulating means in the shape of a pulsating load circuit connected to the subscriber line 44 via a diode bridge 45 and comprising a load resistor 46 of 600 ohms according to the example, a switch 47 controlled by a pulse generator 48 that is itself controlled by a monostable flip-flop 49 in order to generate a pulse train with a frequency chosen within a lower audible region, for example 25 Hz, and with, according to the example, a duration chosen equal to 1 second.

The telephone answering equipment 43 is arranged to reproduce a recording of an alarm information after being influenced by said ringing signal simulating means. In addition, the recording is, according to the example, arranged to be opened with a tone coded dialling in order to establish a connection through the telephone network. Alternatively or in combination therewith, a predetermined connection can be established dependent only on the telephone answering equipment 43 having been influenced by said ringing signal simulating means.

A sensor means 50 is arranged to trigger the monostable flip-flop 49 and to be energized via a pulsating switching means 51 arranged to generate a pulsating direct current voltage between signal ground of the sensor means 50 and the subscriber line 44. The sensor means 50 in the telephone subscriber equipment 42 is energized from the subscriber line 44 via the diode bridge 45, the load resistor 46, a shunting protection diode 52, a series insulation diode 53 and an electrolytic capacitor 54.

The pulsating switching means 51 has a pulsation frequency chosen higher than 3 kHz and preferably lower than 20 kHz. According to the example, the pulsation frequency is equal to 15 kHz. A control input 55 is connected to an oscillator 56 arranged to provide said pulsation frequency. This is arranged to be modulated, for example by simply interrupting the oscillation, dependent on a control signal generated by a threshold detector 57 with a rectifying input circuit 58, whereby said signal ground is arranged to be capable of constituting a capacitive output for controlling means arranged to be capable of sensing that the pulsating direct voltage at the signal ground is modulated.

The object with the sensor means 50 is to influence the telephone answering equipment 43 when a capacitive change in the environment is detected via an antenna 59 built into the telephone subscriber equipment 42. Thanks to the low impedance with respect to ground exhibited by the subscriber line, the pulsating direct current voltage between the signal ground of the sensor means 50 and the subscriber line 44 will result in that the antenna 59 sees the entire ground plane oscillate with said pulsation frequency. This makes a presence indication on the basis of changes in the electric capacitance possible with a high reliability in the desired function and with good economy with regard to current consumption as well as component cost.

For triggering the monostable flip-flop 49, the sensor means 50 comprises a threshold detector 60 with a rectifying input circuit 61 that has a capacitive connection 62 to the signal ground of the sensor means 50.

Capacitive connections to the signal ground of the sensor means 50 can also be employed to control arbitrary external means. A semiconductor device that can control an external AC load of the reactive as well as the resistive kind is, for example, found in the circuit MM 58312 from National Semiconductor.

The threshold detector 57 can be based on the very same circuit MM 58312 or, in an embodiment with thresholds at a plurality of levels, comprise for example the analog-to-digital converter ICL7136 from Intersil, Inc., in combination with suitable signal processing digital means.

According to the example, the oscillator 56 and the threshold detector 57 in the sensor means 50 are energized partly via the pulsating switching means 51 from a negative pole of the electrolytic capacitor 54, and partly via a series resistor 63 and an electrolytic capacitor 64 from a positive pole of the same electrolytic capacitor 54.

The operating voltage that the electrolytic capacitor 64 supplies to the oscillator 56 and to the threshold detector 57 shall be substantially lower than the voltage from the subscriber line 44 in order to give the pulsating direct voltage between the signal ground of the sensor means 50 and the subscriber line 44 the highest possible amplitude. A zener diode can, for example, regulate said operating voltage to 5 volts while the voltage from the subscriber line is 48 volts, the amplitude of said pulsating direct current voltage being the difference between these, 43 volts.

The embodiment according to the drawing can be modified in several ways. For example, the series resistor 63 and the pulsating switching means 51 can change places in the energizing circuitry or the amplitude of said pulsating direct current voltage can be increased by connecting a shunting resistor between the signal ground of the sensor means 50 and the positive pole of the electrolytic capacitor 54, or by connecting a second pulsating switching means connected as said shunting resistor and controlled by the oscillator 56 in the opposite phase with regard to the pulsating switching means 51.

It is suitable although not necessary that the energizing circuit is complemented by a voltage regulator controlled by the input voltage to a threshold detector 57 in order to give this a predetermined operating interval by influencing the amplitude of the pulsating direct current voltage between the signal ground of the sensor means 50 and the subscriber line 44.

For the described function of the sensor means 50, it is in principle of no importance whether the subscriber line is replaced by another kind of low-current line with a low impedance with respect to ground or even by a power line in an electric network. A telecommunication channel as employed by the invention can be established via the same power line using means that are known per se.

According to the example, the telephone answering equipment 43 is, without any external influence and within a time slot arranged for the transmittal of a status information and of said alarm information, arranged to send a recorded restoring information regarding the latter to a receiver via the subscriber line and said telephone network. In order to make it possible to transfer different types of status information within the time slot in accord to the invention, the telephone answering equipment 43 and the telephone subscriber equipment 42 should be connected to a terminating telephone jack along the subscriber line 44, whereby other telephone subscriber equipments as, for example, described in the following, can at any time take over the subscriber line 44 in order to send actual status information, preferably in the form of tone codes.

Figure 3:
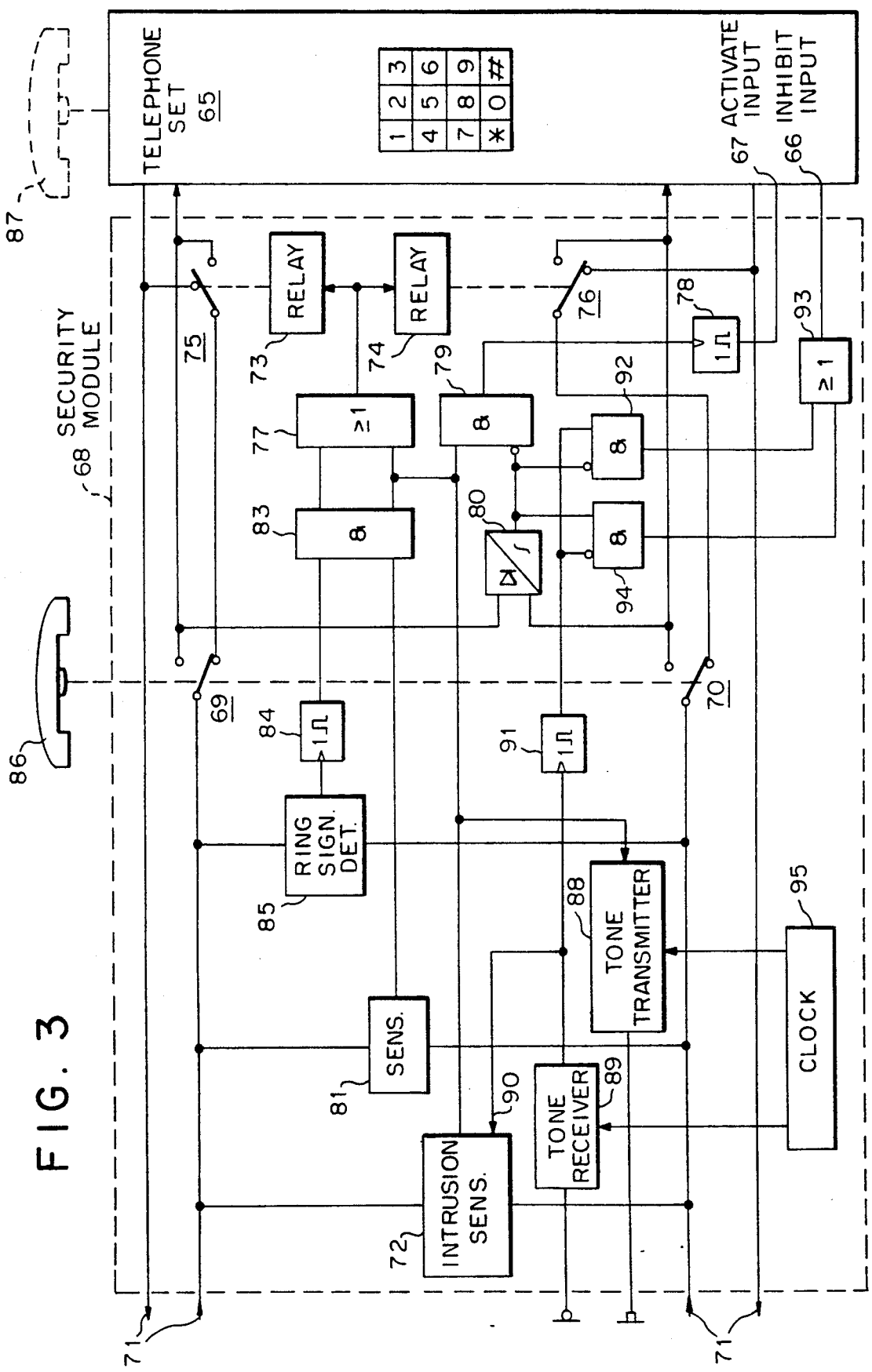

FIG. 3 is a block diagram of a telephone subscriber equipment representing a preferred embodiment of the security system of the invention and comprising a telephone set 65 equipped for stored program controlled dialling as known per se and provided with an inhibiting input 66 for all dialling and with an activation input 67 for a predetermined dialling sequence. The telephone set 65 is provided with a security module 68 and is by means of this arranged to be capable of being in a state corresponding electrically to off-hook in a switched-on state of the security system.

The security module 68 is provided with hook switching means 69 and 70 arranged, in the switched-on state of the security system, to disconnect a connection between a subscriber line 71 and the telephone set 65, an intrusion sensor means 72 being arranged for sending an alarm information by influencing relay means 73 and 74 with associated contact means 75 and 76, respectively, so as to reestablish said connection between the telephone set 65 and the subscriber line 71, the activation input 67 being simultaneously influenced for dialling in accordance with the predetermined dialling sequence.

For said purpose, the sensor means 72 is connected to the relay means 73 and 74 via an OR-gate 77 and to the activation input 67 via a monostable flipflop 78 triggered by an AND-gate 79 with an inverting input controlled by a voltage detector 80 connected to the input of the telephone set 65 for the subscriber line 71 and consisting of a diode bridge with a capacitor load that will delay its output signal somewhat.

The sensor means 72 is arranged to send the alarm information in the form of tone codes on the subscriber line 71 and is complemented with a sensor means 81 arranged to send status information also in the form of tone codes on the subscriber line 71. In addition, this can be obtained after an external influence thereby that the sensor means 81 is connected to the relay means 73 and 74 via the OR-gate 77 and an AND-gate 83 controlled by a monostable flipflop 84 triggered by a ringing signal detector 85 in order to reestablish the connection between the telephone set 65 and the subscriber line 71 during a predetermined time interval.

The status information can, for example, relate to a broken alarm circuit, low temperature or the like and be obtained upon calling only if this is occurring so that the sensor means 81 influences the relay means 73 and 74 via the AND-gate 83 and the OR-gate 77 to connect the telephone set 65 to the subscriber line 71.

In the preferred embodiment of the security system according to the invention, this is arranged to be shifted between said switched-on state and a switched-off state dependent on a choice between two different positions 86 and 87, respectively, of the handset on-hook, one of which corresponding electrically to off-hook and the other corresponding electrically to on-hook with respect to the telephone set 65.

To prevent that the sensor means 72 will unnecessarily establish a telephone connection and transmit its alarm information also when authorized persons enter its area of protection, a tone transmitter 88 is arranged to locally emit an enquiring signal and a tone receiver 89 is arranged to locally receive from authorized persons a predetermined acoustic answering signal and, dependent thereon, to generate an inhibiting information for influencing the transmittal of the alarm information partly via an inhibiting input 90 of the sensor circuit 72, and partly via a connection to said inhibiting input 66 of the telephone set 65 via a monostable flipflop 91, an AND-gate 92 with an inverting input controlled by the voltage detector 80 and an OR-gate 93, the monostable flipflop 91 being given a pulse duration of some ten seconds.

The tone transmitter 88 is, also in the switched-off state of the security system, arranged to emit the acoustic enquiring signal when a person enters into the protection area of the sensor means 72, the tone receiver 89 being, in the absence of the acoustic answering signal from an authorized person, arranged to inhibit dialling by un-authorized persons through a connection to the inhibiting input 66 of the telephone set 65 via the monostable flipflop 91 and an AND-gate 94 with an inverting input connected to the monostable flipflop 91, a not-inverting input connected to the voltage detector 80 and an output connected to the OR-gate 93.

In the preferred embodiment of the security system of the invention, the sensor means 72 is designed for a capacitive sensor function of the same kind as the sensor means 50 in FIG. 2 and the tone transmitter 88 is together with the tone receiver 89 designed for tone code signalling, a clock means 95 being arranged to continuously, with an interval of some minutes, change the tone code that is valid to prevent that it is being recorded to be re-employed by unauthorized persons. The authorized persons should in this case be provided with clock controlled and tone code based key means which can be based on a further development of commonly used pocket diallers as well as on a further development of the key rings that provide a whistling answer when they are whistled to and that also are in common use today.

A synchronization of the clocks used in the pocket keys to the clock means 95 in the security module 68 to provide a parallel control of the continuous change of the tone code that shall be valid is a condition that must be fulfilled but will give key means of the described kind a higher security than conventional key means and also permit an employment of the inexpensive technology in modern digital wrist watches.

Figure 4:
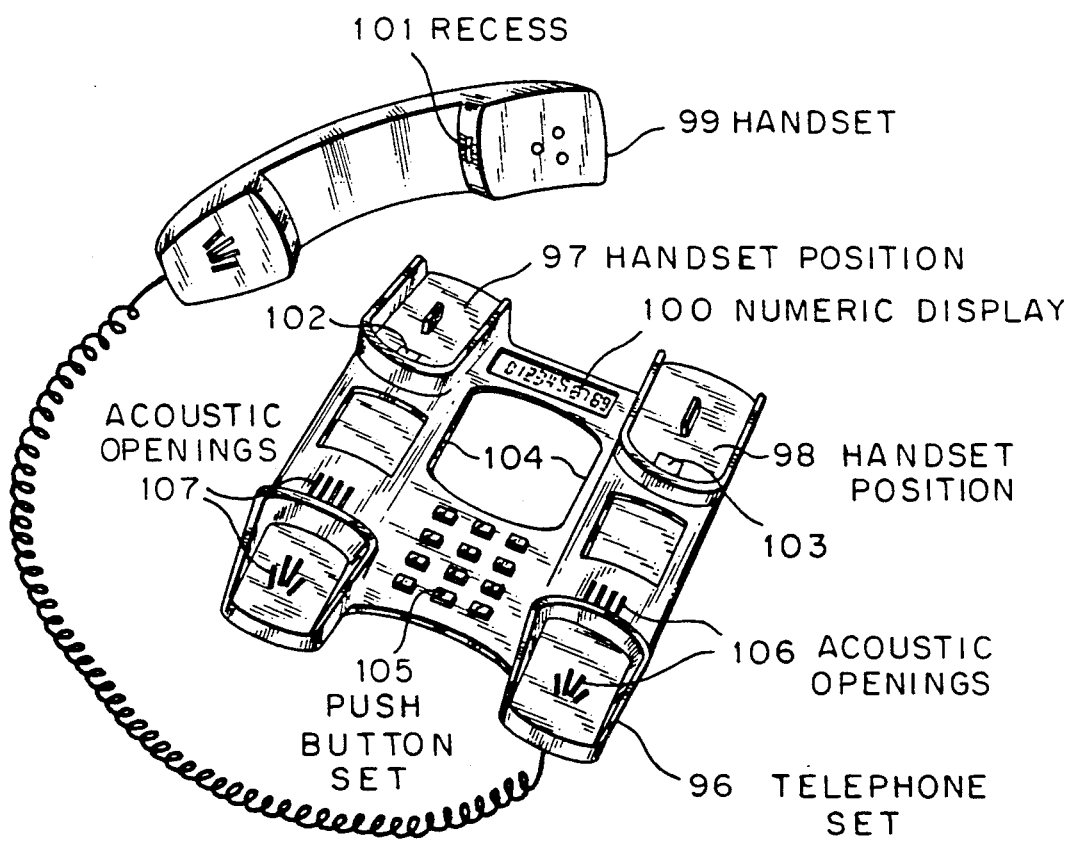

FIG. 4 is a perspective view of a preferred design of a telephone set 96 that can constitute a complete security system in accordance to the invention. The telephone set 96 can be shifted between a switched-on state of the security system and a switched-off state of this in dependence on a choice between two different positions 97 and 98, respectively, of a handset 99 on-hook, whereby switching the security system on and off can become a daily routine of all persons involved.

The telephone set 96 is, according to the example, provided with a numeric display 100 to show stored telephone numbers in known manner, stored alarm information or status information intended to be sent by the security system whenever needed, and receives such information provided that the telephone incorporates a receiver for this purpose such as is described in reference to FIG. 1.

Besides the two positions 97 and 98 of the handset having the object of making the control of the security system natural also to children and elderly people, the advantage is obtained that the space available for the internal circuitry can be increased with maintained demands on a slim design and that the telephone 96 will be easily recognized on the market as carrying the security system of the invention.

A recess 101 in the handset 99 and corresponding reeds 102 and 103 for respective handset positions 97 and 98 make the telephone set 96 easily mountable on a wall. The incorporation of a surveillance monitor in the security system is facilitated by a recess 104 for the screen of the surveillance monitor.

In addition, the telephone set 96 is provided with a pushbutton set 105 and with acoustic openings 106 and 107 for a tone ringer and for listening to sounds in the environment in a switched-on state of the security system after an alarm information has been sent and the time slot according to the invention has been opened for the transmittal of any kind of status information.

In the preferred embodiment of the invention, the telephone set 96 comprises the capacitive sensor means 50 described in connection with FIG. 2, the antenna 59 constituting a separate part of a copper foil of a printed circuit in the telephone set 96 and enabling a detection of intrusion through a presence indication within a radius of 2 meters around the telephone set 96.

The signal ground of the sensor means 50 is preferably given an area that substantially equals the area of the antenna 59 on the printed circuit so as to control in a capacitive way as previously described external AC loads like lamps that are turned on a while to act as a deterrent from intrusion using associated control means based on the mentioned semiconductor device MM 58312 and applied as capacitor plates for example on the bottom side of the telephone set 96.

The built-in presence indication is preferably complemented with the acoustic control of authorized persons as described in connection with FIG. 3, the tone transmitter 88 and the tone receiver 89 then utilizing the acoustic openings 106 and 107, respectively. Other suitable options are built-in detection of low temperature or of sounds generated by stand-alone fire or inundation alarms, etc.

The scope of protection of the invention is, of course, not limited to the described embodiments that the man skilled in the art can modify and build upon in many ways but is defined only by the characteristics in the subsequent claims.

We claim:

1. Security system comprising a signal transmitter (1) with a first sensor means (2) for conveying status information to a receiver means (3) via a telecommunication channel (4), the signal transmitter being built into telephone subscriber equipment (42) and the telecommunication channel comprising a subscriber line in a telephone network, a second sensor means (5), with a higher sensitivity than the first sensor means, being arranged to be influenced by the same environment as the first sensor means and to transmit alarm information to the receiver means via the telecommunication channel, time measuring means for opening a time slot of predetermined length for the transmittal of status information and alarm information to the receiver means in response to a signal from said second sensor means, and restoring means (6) operative without any external influence and within said time slot of predetermined length to transmit restoring information regarding the alarm information to the receiver.

2. Security system according to claim 1, wherein said telephone subscriber equipment comprises a telephone set (65) arranged to electrically be off-hook in a switched-on state of said security system and provided with switching means (69, 70) arranged to interrupt a connection between said subscriber line and said telephone set in said switched-on state, said second sensor means being capable of influencing said switching means to reestablish said connection between said telephone set and said subscriber line.

3. Security system according to claim 2, wherein said telephone set has a dialling means provided with an activation input (67) connected to said second sensor means.

4. Security system according to claim 2, whereby said telephone subscriber equipment has a ringing signal detector means (85) arranged to influence said switching means dependent on said second sensor means to reestablish during a predetermined time interval said connection between said telephone set and said subscriber line in said telephone network.

5. Security system according to claim 2, wherein said telephone set is arranged to be switched between said switched-on state of said security system and a switched-off state dependent on a choice between two different positions (97 and 98) of the handset on-hook, one of said positions corresponding electrically to off-hook in said switched-on state of said security system and the other position corresponding electrically to on-hook.

6. Security system according to claim 2, wherein said restoring circuit is provided with a tone transmitter (88) arranged to be influenced by said second sensor means to locally emit an acoustic enquiring signal and a tone receiver (89) arranged to locally receive from an authorized person a predetermined acoustic answering signal and dependent thereof generate inhibiting information for influencing said transmittal of said alarm information to said receiver means.

7. Security system according to claim 6, wherein said tone receiver is in said switched-off state of said security system arranged to inhibit dialling at said telephone set in absence of said acoustic answering signal.

8. Security system according to claim 1, wherein said telephone subscriber equipment is provided with ringing signal simulating means (46, 47, 48, 49) with an activation input connected to said second sensor means, to influence other telephone subscriber equipments locally along said subscriber line in said telephone network.

9. Security system according to claim 8, wherein said ringing signal simulating means comprises a pulsating load circuit (46, 47) connected to said subscriber line and arranged to generate a pulse train having a frequency within a lower audible frequency region and a duration substantially equal to 1 sec.

10. Security system according to claim 8, wherein a telephone answering equipment (43) is connected to said subscriber line and is arranged to reproduce a recording of said alarm information after being influenced by said ringing signal means.

11. Security system according to claim 10, wherein said recording is arranged to be opened with a tone coded dialling in order to establish a connection to said receiver means via said telephone network.

12. Security system according to claim 10, wherein a predetermined connection to said receiving means is arranged to be, without dialling, established via said telephone network dependent on said telephone answering equipment having been influenced by said ringing signal simulating means.

13. Security system according to claim 1, wherein said second sensor means has a capacitive input and is energized by said subscriber line in said telephone network via a pulsating switching means (51) arranged to generate a pulsating direct current voltage between signal ground of said second sensor means and said subscriber line.

14. Security system according to claim 13, wherein said pulsating switching means has a pulsating frequency higher than 3 kHz and lower than 20 kHz.

15. Security system according to claim 13, wherein said second sensor means comprises a threshold detector (57) with a rectifying input circuit (58).

16. Security system according to claim 15, wherein said first and second sensor means share said threshold detector, said detector comprising an analog-to digital converter with a first measuring threshold utilized by said first sensor means and a second measuring threshold with a higher sensitivity utilized by said second sensor means.

17. Security system according to claim 13, wherein said pulsating switching means has a control input (55) connected to said second sensor means for modulation of said pulsating frequency, said signal group being arranged to constitute a capacitive output for controlling means arranged to sense said modulation.

18. Security system according to claim 1, wherein said receiver means comprises telephone answering means (10) arranged to be connected to said subscriber line in order to receive said status information, alarm information and restoring information, and ringing signal generating means (11, 12) with an activation input (13) connected to logical means (14, 15, 16, 17, 18, 19, 20, 21) connected to said telephone answering means and arranged to delay an activation of said ringing signal generating means under said predetermined time slot dependent on a reception of said alarm information, to activate, with priority over said delay, said ringing signal generating means dependent on a reception of said status information, and to prevent said delayed activation of said ringing signal generating means dependent on a reception of said restoring information.

* * * * *